United States Patent
Tsuritani et al.

(10) Patent No.: US 7,747,167 B2
(45) Date of Patent: Jun. 29, 2010

(54) WAVELENGTH SERVICE PROVIDING APPARATUS IN ALL-OPTICAL NETWORK

(75) Inventors: Takehiro Tsuritani, Fujimino (JP); Tomohiro Otani, Fujimino (JP)

(73) Assignee: KDDI Corporation, Tokyo (JP)

( * ) Notice: Subject to any disclaimer, the term of this patent is extended or adjusted under 35 U.S.C. 154(b) by 483 days.

(21) Appl. No.: 11/607,962

(22) Filed: Dec. 4, 2006

(65) Prior Publication Data
US 2007/0127924 A1    Jun. 7, 2007

(30) Foreign Application Priority Data
Dec. 5, 2005    (JP) .............................. 2005/350534

(51) Int. Cl.
*H04J 14/00* (2006.01)
(52) U.S. Cl. .............................. 398/49; 398/45; 398/48; 398/51
(58) Field of Classification Search ............... 398/45–51
See application file for complete search history.

(56) References Cited

U.S. PATENT DOCUMENTS

2003/0215233 A1* 11/2003 Tomofuji et al. .............. 398/41
2004/0190900 A1    9/2004 Yagyu
2004/0208544 A1* 10/2004 Ovadia ........................ 398/47

FOREIGN PATENT DOCUMENTS

JP    2004-297230    10/2004

* cited by examiner

*Primary Examiner*—Quan-Zhen Wang
(74) *Attorney, Agent, or Firm*—Westerman, Hattori, Daniels & Adrian, LLP

(57) ABSTRACT

An optical signal is transmitted via a transponder 13, an all-optical node 1, and a WDM device 4 including an optical filter 38. A control means which includes a route and wavelength selecting functional part 32, transmits a request band information and a wavelength information based on a requested band information, link information of a network, and band limitation information with respect to each filter wavelength of the optical filter 38. A multi-rate functional part 36 sends a bit rate varying request to set a band to be requested to the network side according to the requested band information. A wavelength varying functional part 37 sends a wavelength varying request to set a wavelength of the optical signal according to the wavelength information. The optical filter 38 includes a bit rate (band) dependent wavelength multiplexing and demultiplexing functional part 39.

8 Claims, 3 Drawing Sheets

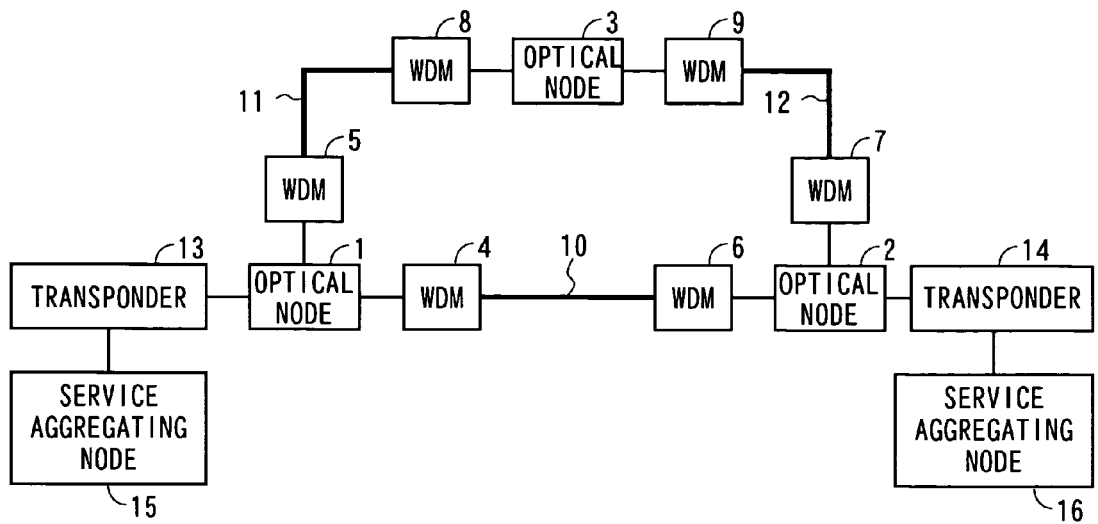
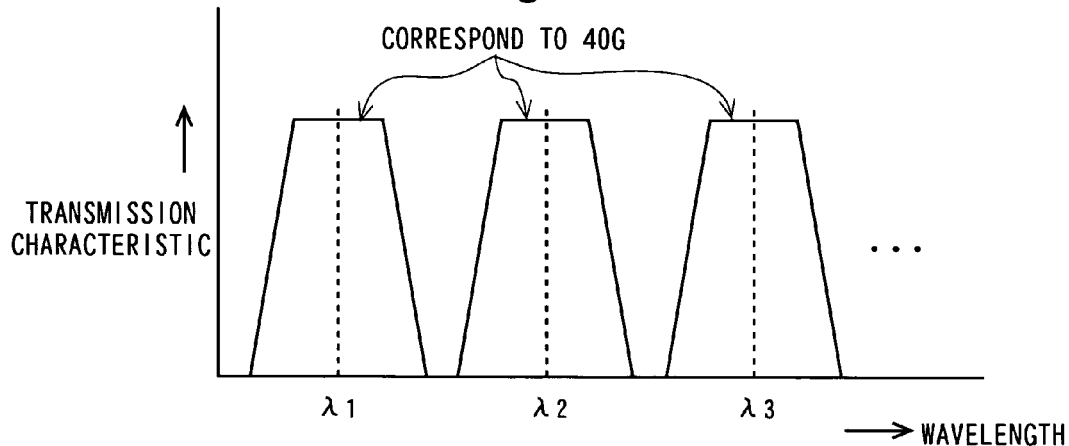
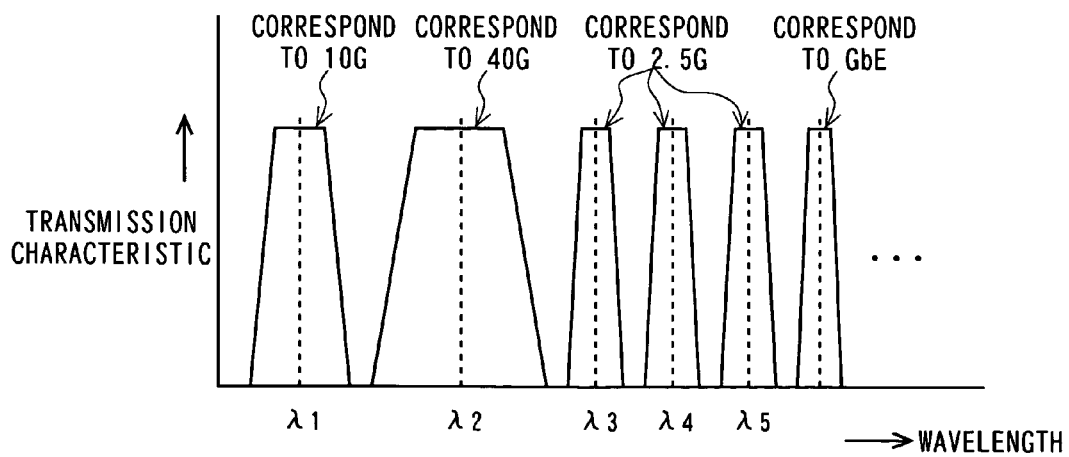

WAVELENGTH SERVICE PROVIDING APPARATUS IN ALL-OPTICAL NETWORK

BACKGROUND OF THE INVENTION

1. Field of the Invention

The present invention relates to a wavelength service providing apparatus in wavelength multiplexing transmission, more specifically, to a wavelength service providing apparatus in an all-optical network constructed by all-optical nodes that include no OEO (optical-electrical converting) part.

2. Description of the Related Art

Conventional optical networks are constructed by connecting optical nodes including optical cross connects (OXC) by transmitting devices such as WDM devices (hereinafter, referred to as WDM devices) and transmission lines (hereinafter, referred to as WDM lines). In the WDM device, an OEO part and a wavelength multiplexing and demultiplexing optical filter which wavelength-multiplexes or wavelength-demultiplexes an optical signal are included. To an optical node, a transponder including an OEO part is connected, and services for a user are provided via this transponder.

It has been proposed that an all-optical network is constructed by eliminating conversion into electrical signals by deleting the OEO part from the WDM device. According to the all-optical network, the network can be constructed at low cost, and signal delays in the network can be reduced.

In the all-optical network, wavelengths are limited in wavelength path setting, however, the factor to limit the band is only the wavelength multiplexing and demultiplexing optical filter, so that the band is not limited as long as the wavelength multiplexing and demultiplexing optical filter has a characteristic (bandwidth) to transmit a requested band (bit rate) without deterioration. Therefore, a user can freely request a band at the time of wavelength path setting request.

Patent Document 1 proposes an optical network in which means for autonomously advertising and collecting available wavelengths in a transmission line is provided in an optical network transmission device (node) and route computation of a wavelength path is performed based on the available wavelengths collected by the means.

[Patent Document 1] Japanese Published Unexamined Patent Application No. 2004-297230

When a service is provided to a user via a transponder, the band of the wavelength path is limited by the band of this transponder. To make it possible for a user to freely request a band, many transponders must be prepared according to the bands requested by the user, and this is not realistic. Under a condition that the number of transponders to be prepared is limited, wavelength service flexible provision is difficult.

In the optical network proposed in Patent Document 1, computation of a wavelength path is performed based on available wavelengths at each node, and this prevents a path setting failure that is caused by wavelength limitation. However, this does not include a wavelength variable function and a band variable function for a user, so that flexible wavelength service provision is difficult.

SUMMARY OF THE INVENTION

An object of the present invention is to solve the problem described above and provides a wavelength service providing apparatus which can flexibly respond to users' requests by effectively using network resources in an all-optical network constructed by all-optical nodes without including an OEO part.

In order to accomplish the object, a feature of this invention is that a wavelength service providing apparatus in an all-optical network, constructed by a transmission device including an all-optical node, a transponder on a user side, and a wavelength multiplexing and demultiplexing optical filter on the network side, comprising control means for sending a band varying request and a wavelength varying request to the transponder based on a requested band in a wavelength path setting request, link information in the network, and band limitation information with respect to filter wavelengths of the wavelength multiplexing and demultiplexing optical filter; multi-rate functional means which is provided in the transponder and sets a band to be requested to the network side according to the band varying request; and wavelength varying means which is provided in the transponder and sets a wavelength of an optical signal for the network side according to the wavelength varying request.

Also, a feature of this invention is that, the wavelength service providing apparatus in an all-optical network comprises route and wavelength selecting means, and this route and wavelength selecting means acquires link information in the network and band limitation information with respect to the respective filter wavelengths of the wavelength multiplexing and demultiplexing optical filter, and determines an optimal route according to the wavelength path setting request and a wavelength according to the band varying request.

Also, a feature of this invention is that, the wavelength multiplexing and demultiplexing optical filter has transmission characteristics which enable wavelength multiplexing and demultiplexing of an optical signal of a maximum requested band at all filter wavelengths without deterioration.

Also, a feature of this invention is that, the wavelength multiplexing and demultiplexing optical filter has transmission characteristics which enable wavelength multiplexing and demultiplexing of an optical signal of any requested band at each filter wavelength without deterioration.

Also, a feature of this invention is that, the control means is provided on the network side.

Also, a feature of this invention is that, the control means is provided on the user side.

Herein, the control means can be provided on the network side or the user side, or on both of these sides.

According to the present invention, in an all-optical network which realizes low costs and low delays, a band can be flexibly set in response to a wavelength path setting request from a user, and wavelength services effectively using network resources can be provided. A user can receive services of the all-optical network without consciousness of optical wavelengths. By providing control means on the user side, the network development can be arbitrarily set from the user side.

BRIEF DESCRIPTION OF THE DRAWINGS

FIG. 1 is a block diagram showing a construction example of an all-optical network to which the present invention is applied;

FIGS. 2A and 2B are characteristic diagrams of a wavelength multiplexing and demultiplexing optical filter;

DETAILED DESCRIPTION OF THE PREFERRED EMBODIMENTS

Figure 3:
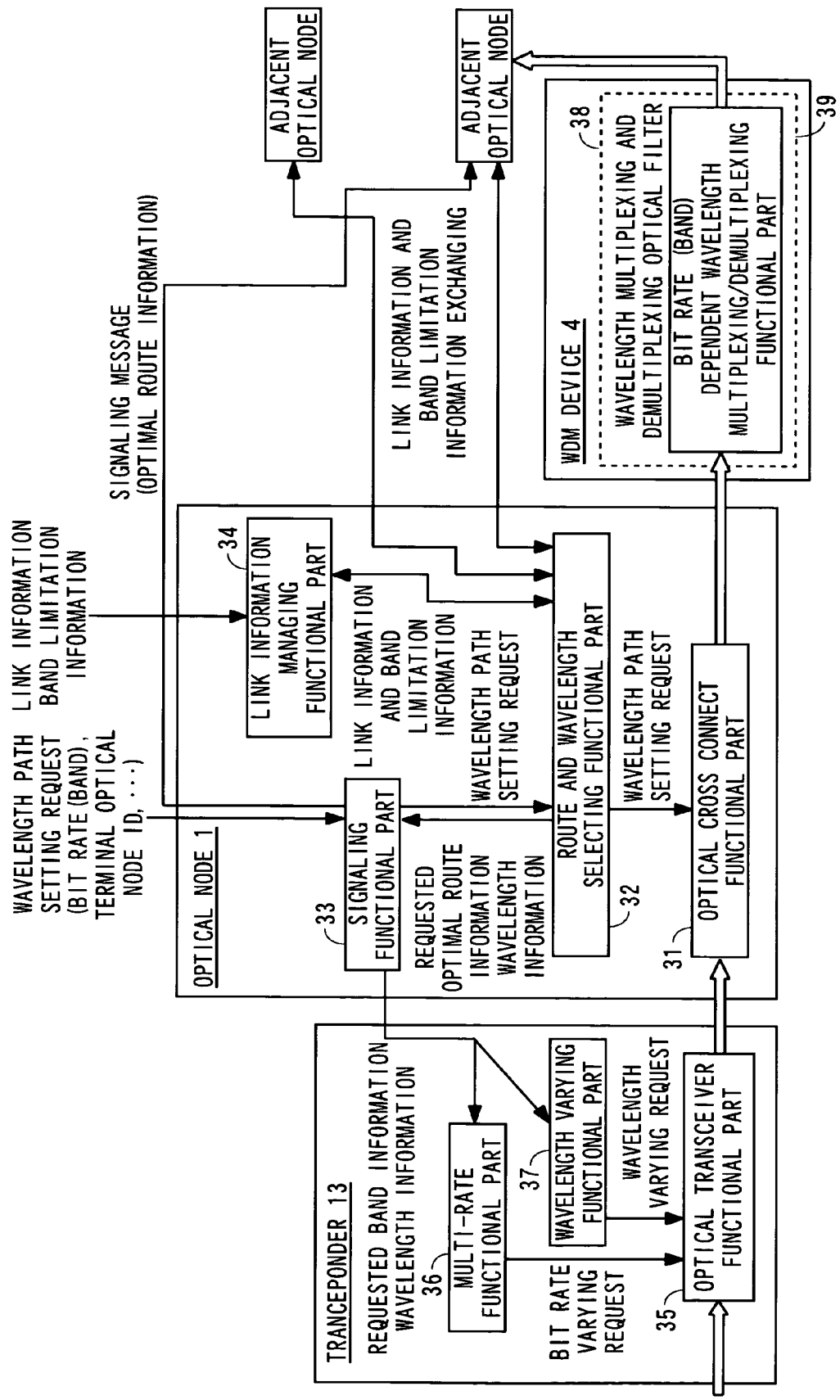
FIG. 3 is a function block diagram showing a first embodiment of an optical node, a transponder, and a wavelength multiplexing and demultiplexing optical filter.

Hereinafter, the present invention will be described with reference to the drawings. FIG. 1 is a block diagram showing a construction example of an all-optical network to which the present invention is applied. The all-optical network includes a plurality of optical nodes 1 through 3, and the optical nodes are connected to each other by WDM devices 4 through 9 and WDM transmission lines 10 through 12. The optical nodes 1 through 3 include OXC (Optical Cross Connect) and ROADM (Reconfigurable Optical Add Drop Multiplexor), and have no OEO part. Herein, three optical nodes 1 through 3 are illustrated, however, the number of nodes and the network composition are arbitrary.

To the optical nodes 1 and 2, service aggregation nodes 15 and 16 are connected via transponders 13 and 14, respectively. Similarly, a service aggregation node may be connected to the optical node 3.

Wavelength path setting requests from users are aggregated by the service aggregating nodes 15 and 16, and sent to the optical nodes 1 and 2 via the transponders 13 and 14. The optical nodes 1 and 2 determine optimal routes by performing route computation in response to the wavelength path setting requests, and send out signaling messages. By autonomously exchanging signaling messages between the optical nodes, wavelength paths passing through the optimal routes are set.

The transponders 13 and 14 can freely set bands to be requested to the network according to bands requested from the user side (multi-rate adaptable) and can freely set a wavelength (wavelength tunable).

The WDM devices 4 through 9 have wavelength multiplexing and demultiplexing optical filters which wavelength-multiplex or wavelength-demultiplex optical signals. The wavelength multiplexing/demultiplexing function of the wavelength multiplexing and demultiplexing optical filter depends on a bit rate (band), and has transmission characteristics (filter bandwidth, wavelength interval) sufficient to, for example, multiplex and demultiplex an optical signal of the maximum requested band at all filter wavelengths, or has transmission characteristics to multiplex and demultiplex an optical signal without deterioration in any requested band in each filter wavelength. The wavelength multiplexing and demultiplexing optical filters in the network have the same characteristics.

In the transponders 13 and 14, bit rates (bands) in the wavelength path setting requests are set. In the WDM devices 4 through 9, based on the transmission characteristics of the wavelength multiplexing and demultiplexing optical filters, wavelengths which enable transmission of optical signals of the bit rates of the wavelength path setting requests from an initiator (start) optical node to a terminator (terminal) optical node without deterioration are selected, and in the transponders 13 and 14, the selected wavelengths are set. When selecting wavelengths, link information showing a wavelength use status in links of the whole network is referred to.

FIGS. 2A and 2B show examples of characteristic diagrams of the wavelength multiplexing and demultiplexing optical filter. FIG. 2A shows an example of transmission characteristics which enable wavelength multiplexing and demultiplexing without deterioration of an optical signal of the maximum requested band at all filter wavelengths, and for example, a maximum transmission band is requested with respect to the maximum bit rate 40 G, the filter has the maximum transmission band at the respective filter wavelengths $\lambda 1, \lambda 2, \lambda 3$ . . . .

FIG. 2B shows an example of transmission characteristics which enable wavelength multiplexing and demultiplexing of an optical signal in any requested band at each filter wavelength, and for example, having the GbE, 2.5 G, 10 G, and 40 G transmission bands at the respective wavelengths $\lambda 1, \lambda 2, \lambda 3$ . . . . The numbers of GbE, 2.5 G, 10 G, and 40 G transmission bands to be assigned to the wavelength multiplexing and demultiplexing optical filter are determined according to expected demand of a requested band, and for a requested band with higher potential demand, a larger number of transmission bands are assigned.

When using the characteristics shown in FIG. 2A, the wavelength to be assigned in response to a path setting request is not limited by the characteristics of the wavelength multiplexing and demultiplexing optical filter, and any wavelength can be assigned, so that control becomes easy, however, when a wide bandwidth is taken at each filter wavelength, the frequency use efficiency lowers, and this is disadvantageous in terms of effective use of transmission bands.

When using the characteristics of FIG. 2B, a wavelength to be assigned in response to a path setting request is limited by the characteristics of the wavelength multiplexing and demultiplexing optical filter, and control to assign a wavelength of a band more than the requested band must be performed for the path setting request, and this is advantageous in terms of frequency use efficiency.

FIG. 3 is a function block diagram showing a first embodiment of an optical node, a transponder, and a wavelength multiplexing and demultiplexing optical filter. Hereinafter, the portion relating to the optical node 1 will be described, and the optical nodes 2 and 3 can be described in the same manner.

The optical node 1 includes an optical cross connect functional part 31, a route and wavelength selecting functional part 32, a signaling functional part 33, and a link information managing functional part 34. The transponder 13 includes an optical transceiver functional part 35, a multi-rate functional part 36, and a wavelength varying functional part 37, and a wavelength multiplexing and demultiplexing optical filter 38 included in the WDM device 4 includes a bit rate (band) dependent wavelength multiplexing/demultiplexing functional part 39.

An optical signal from the service aggregation node 15 is inputted into the optical cross connect functional part 31 of the optical node 1 via the transceiver functional part 35 of the transponder 13, switched according to route selection by the route and wavelength selecting functional part 32, and sent to an adjacent optical node via the WDM device 4. In the WDM device 4, the optical signal is multiplexed with other optical signals by the bit-rate (band) dependent wavelength multiplexing/demultiplexing functional part 39 of the wavelength multiplexing and demultiplexing optical filter 38.

The link information managing functional part 34 holds and manages link information including link wavelength information and band limitation information. The link wavelength information shows a wavelength use status in each link of the network, and is used for judging available unused wavelengths at the time of wavelength path setting.

The band limitation information is used for limiting a wavelength to be used in response to a wavelength path setting request. The wavelength multiplexing and demultiplexing optical filter 38 must transmit an optical signal with a bit rate (band) requested by the wavelength path setting request without deterioration. When the wavelength multiplexing and demultiplexing optical filter 38 has band characteristics which enable wavelength multiplexing and demultiplexing of an optical signal of a maximum requested band at all filter wavelengths without deterioration, the wavelength to be assigned in response to the path setting request is not limited by the characteristics of the wavelength multiplexing and demultiplexing optical filter, so that it poses no problem. Therefore, band limitation information in this case may not limit the wavelength to be assigned. However, when the wavelength multiplexing and demultiplexing optical filter has band characteristics which enable wavelength multiplexing and demultiplexing of an optical signal of any requested band at each filter wavelength, it must be limited so as to use a filter wavelength (channel) having a band which transmits an optical signal with a bit rate (band) requested by the wavelength path setting request without deterioration. The band limitation information is used for such limitation.

For example, in the wavelength multiplexing and demultiplexing optical filter 38, a filter wavelength whose band is maximum can be used in response to all wavelength path setting requests, and filter wavelengths whose bands are less than said maximum band are not available for a wavelength path setting request of a bit rate exceeding this. It is comprehensively judged which of the filter wavelengths is assigned to a bit rate of a wavelength path setting request based on link information and band limitation information of the whole network.

The link information and band limitation information of the whole network are acquired by exchanging the link information between the route and wavelength selecting functional part 32 and an adjacent node and other nodes by using a routing function.

Link information and band limitation information managed by the link information managing functional part 34 are sent to the route and wavelength selecting functional part 32 at the time of wavelength path setting. Wavelength information and band limitation information are provided as link attributes of the set wavelength path.

The route and wavelength selecting functional part 32 has a routing function, and determines an optimal route by performing route computation according to wavelength path setting request information. The route and wavelength selecting functional part 32 exchanges link information and band limitation information with an adjacent node and other nodes (distributes unused wavelength (resource) information and band limitation information at the time of link status advertisement using a routing protocol), makes the link information managing functional part 34 manage the link information and band limitation information that the route and wavelength selecting functional part 32 obtained by itself, and selects a wavelength according to a wavelength path setting request based on these link information and band limitation information.

As the wavelength according to a wavelength path setting request, a wavelength which can be used among optical nodes from the initiator optical node 1 to the terminator optical node and at which an optical signal with a bit rate of the wavelength path setting request can be transmitted without deterioration, from the band characteristics of the wavelength multiplexing and demultiplexing optical filter 38 is selected.

A wavelength path setting request to the optimal route determined by the route and wavelength selecting functional part 32 is sent to the optical cross connect functional part 31, and optimal route information and wavelength information are sent to the signaling functional part 33.

The optical cross connect functional part 31 switches the route according to the wavelength path setting request to the optimal route from the route and wavelength selecting functional part 32.

When a wavelength path setting request for requesting a path which sets the optical node 1 as an initiator and sets another optical node as a terminator is transmitted from the optical node 1 or the transponder 13, the signaling functional part 33 receives the wavelength path setting request (requested band and terminal optical node ID, etc.) and sends these to the route and wavelength selecting functional part 32. When the signaling functional part 32 receives optimal route information and wavelength information from the route and wavelength selecting functional part 32, it sends the optimal route information to an adjacent optical node by means of a signaling message, and makes the adjacent optical node autonomously set a wavelength path. Furthermore, the signaling functional part 33 sends the requested band information of the wavelength path setting request and wavelength information determined by the route and wavelength selecting functional part 32.

The multi-rate functional part 36 of the transponder 13 sends a bit rate varying request to the optical transceiver functional part 35 according to the requested band information of the wavelength path setting request, and the wavelength varying functional part 37 sends the wavelength varying request to the optical transceiver functional part 35 according to the wavelength information.

The optical transceiver functional part 35 is freely selectable in band and tunable in wavelength, that is, adaptable to multiple rates and tunable, and sends an optical signal with a wavelength according to a wavelength varying request to the optical node 1 at a bit rate selected according to a bit rate varying request. The optical signal with this wavelength passes through the optical cross connect functional part 31 and is sent to an adjacent optical node without being deteriorated by the wavelength multiplexing and demultiplexing optical filter 38.

Figure 4:
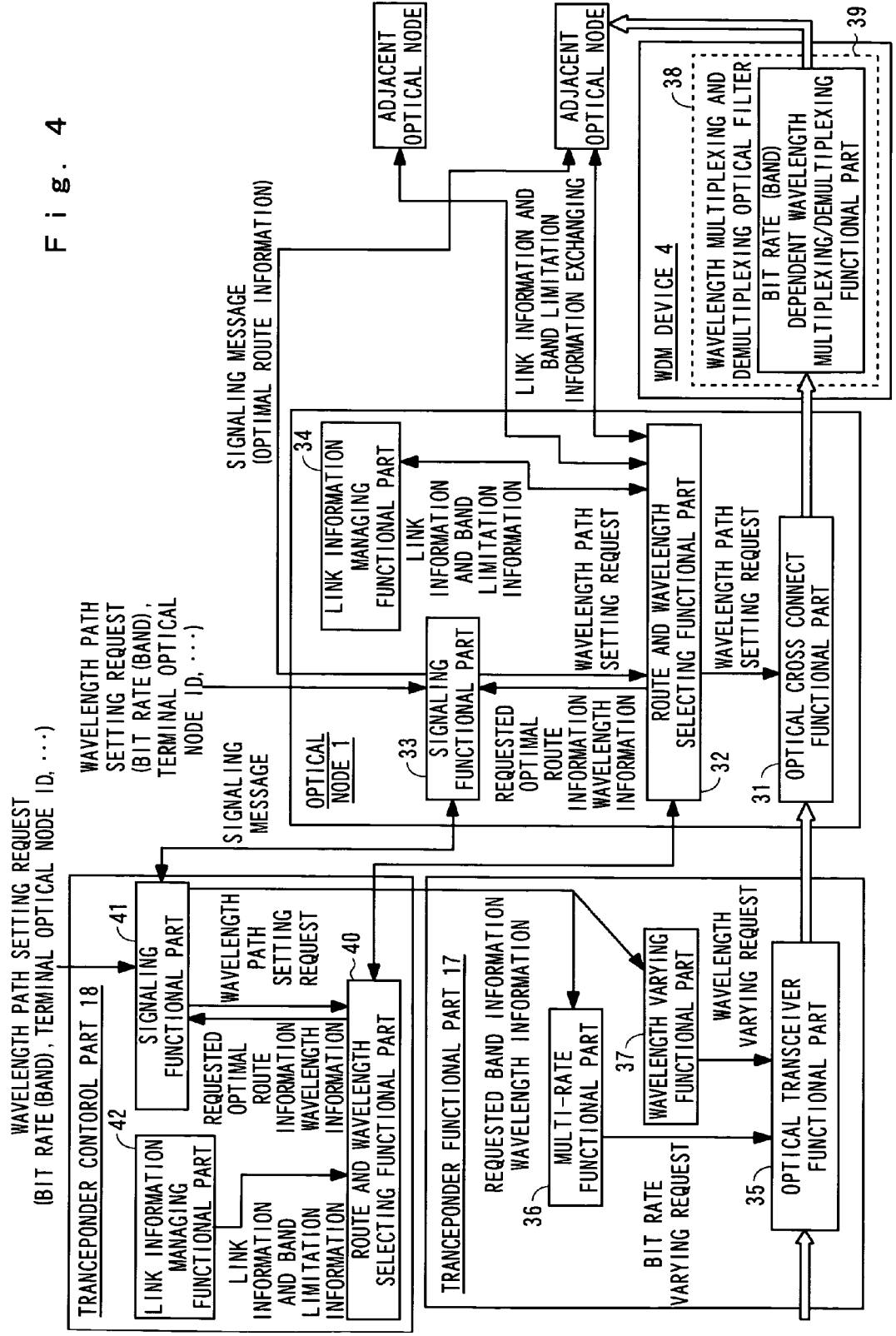
FIG. 4 is a function block diagram showing a second embodiment of an optical node, a transponder, and a wavelength multiplexing and demultiplexing optical filter.

FIG. 4 is a function block diagram showing a second embodiment of an optical node, a transponder, and a wavelength multiplexing and demultiplexing optical filter. According to the first embodiment, a bit rate and wavelength control mechanism is provided for the optical node 1 on the network side, and on the other hand, the second embodiment is different from the first embodiment in that the transponder on the user side is also provided with a bit rate and wavelength control mechanism. In FIG. 4, identical or equivalent portions as those of FIG. 3 are attached with the same reference numerals, and overlapping description is omitted.

The transponder includes a transponder functional part 17 and a transponder control part 18. The transponder functional part 17 includes an optical transceiver functional part 35, a multi-rate functional part 36, and a wavelength varying functional part 37, and the transponder control part 18 includes a route and wavelength selecting functional part 40, a signaling functional part 41, and a link information managing functional part 42.

The link information managing functional part 42 holds and manages link information and band limitation information of the network similarly to the link information managing functional part 34. The route and wavelength selecting functional part 40 and the signaling functional part 41 function similarly to the route and wavelength selecting functional part 32 and the signaling functional part 33, respectively.

The route and wavelength selecting functional part 40 exchanges link information and band limitation information with the route and wavelength selecting functional part 32. A signaling message from the signaling functional part 41 is sent to an adjacent optical node via the signaling functional part 33 of the optical node 1. Furthermore, a wavelength path setting request to an optimal route is sent to the optical cross connect functional part 31 via the signaling functional part 33 and the route and wavelength selecting functional part 32.

The signaling functional part 41 receives the wavelength path setting request (requested band, terminal optical node ID, etc.) and sends it to the route and wavelength selecting functional part 40. The route and wavelength selecting functional part 40 performs route computation based on link information and band limitation information managed by the link information managing functional part 42 to determine an optimal route and a wavelength to be used in response to the wavelength path setting request, and sends them to the signaling functional part 41.

The signaling functional part 41 sends a signaling message including optimal route information to the signaling functional part 33 of the optical node 1 and sends band request information in the wavelength path setting request and determined wavelength information to the transponder control part 17.

The multi-rate functional part 36 of the transponder functional part 17 sends a bit rate varying request to the optical transceiver functional part 35 according to a requested band of the wavelength path setting request, and the wavelength varying functional part 37 sends a wavelength varying request to the optical transceiver functional part 35 according to the wavelength information.

According to the second embodiment, the same operation as in FIG. 3 is obtained by sending the band request information of the wavelength path setting request and the wavelength information from the signaling functional part 33 of the optical node 1 to the transponder functional part 17 via the signaling functional part 41. In addition, by providing the wavelength path setting request to the signaling functional part 41 of the transponder control part 18, the user side can freely select a band and a wavelength and receive network services. In this case, it is preferable that the available bands and wavelengths are limited by the network side according to a contract or the like made between a user and a network administrator.

According to the second embodiment, the control mechanism for sending a band varying request and a wavelength varying request is provided on both of the network side and the user side, however, it is also possible that this control mechanism is provided on only the user side and overlapping functions among the optical nodes and route computation and wavelength selecting function are omitted.

What is claimed is:

1. A wavelength service providing apparatus in an all-optical network, constructed by a transmission device including an all-optical node, a transponder on a user side of the all-optical node, and a wavelength multiplexing and demultiplexing optical filter on a network side of the all-optical node, comprising:

control means, provided in the all-optical node or the transponder, for sending a requested band information, obtained from a wavelength path setting request, to a multi-rate functional means and for sending a wavelength information selected according to the wavelength path setting request to a wavelength varying means based on the requested band information in the wavelength path setting request, link information in the network, and band limitation information with respect to filter wavelengths of the wavelength multiplexing and demultiplexing optical filter;

multi-rate functional means, provided in the transponder, for sending a bit rate varying request to an optical transceiver in the transponder to set a bit rate of the optical signal generated to the network side according to the requested band information; and wavelength varying means, provided in the transponder, for sending a wavelength varying request to the optical transceiver to set a wavelength of the optical signal for the network side according to the wavelength information.

2. The wavelength service providing apparatus in an all-optical network according to claim 1, wherein the control means includes route and wavelength selecting means, and this route and wavelength selecting means acquires link information in the network and band limitation information with respect to the respective filter wavelengths of the wavelength multiplexing and demultiplexing optical filter, and determines an optimal route according to the wavelength path setting request and a wavelength according to the band varying request.

3. The wavelength service providing apparatus in an all-optical network according to claim 1 or 2, wherein the wavelength multiplexing and demultiplexing optical filter has transmission characteristics which enable wavelength multiplexing and demultiplexing of an optical signal of a maximum requested band at all filter wavelengths without deterioration.

4. The wavelength service providing apparatus in an all-optical network according to claim 1 or 2, wherein the wavelength multiplexing and demultiplexing optical filter has transmission characteristics which enable wavelength multiplexing and demultiplexing of an optical signal of any requested band at each filter wavelength without deterioration.

5. A method for providing wavelength service in an all-optical network including an all-optical node, a transponder on a user side of the all-optical node, and a wavelength multiplexing and demultiplexing optical filter on a network side of the all-optical node, said method comprising:

obtaining a requested band information from a wavelength path setting request;

selecting wavelength information, by the all-optical node or the transponder, according to the wavelength path setting request based on the requested band information, link information in the network, and band limitation information with respect to filter wavelengths of the wavelength multiplexing and demultiplexing optical filter;

sending a bit rate varying request to an optical transceiver in the transponder to set a bit rate of the optical signal generated to the network side according to the requested band information; and sending a wavelength varying request to the optical transceiver to set a wavelength of the optical signal for the network side according to the wavelength information.

6. The method according to claim 5, further comprising:

acquiring link information in the network and band limitation information with respect to the respective filter wavelengths of the wavelength multiplexing and demultiplexing optical filter; and determining an optimal route according to the wavelength path setting request and a wavelength according to the band varying request.

7. The method according to claim 5, further comprising wavelength multiplexing and demultiplexing of an optical signal by the wavelength multiplexing and demultiplexing optical filter of a maximum requested band at all filter wavelengths without deterioration.

8. The method according to claim 5, further comprising wavelength multiplexing and demultiplexing of an optical signal by the wavelength multiplexing and demultiplexing optical filter of an optical signal of any requested band at each filter wavelength without deterioration.

* * * * *